United States Patent [19]
Halasa et al.

[11] 4,264,753
[45] Apr. 28, 1981

[54] PROCESS FOR POLYMERIZING CONJUGATED DIENES

[75] Inventors: Adel F. Halasa, Bath; James E. Hall, Akron, both of Ohio

[73] Assignee: The Firestone Tire & Rubber Company, Akron, Ohio

[21] Appl. No.: 152,051

[22] Filed: May 20, 1980

Related U.S. Application Data

[62] Division of Ser. No. 86,222, Oct. 18, 1979.

[51] Int. Cl.$^3$ .............................................. C08F 4/56
[52] U.S. Cl. .................................... 526/180; 526/179; 526/335
[58] Field of Search ..................... 526/180, 179, 335; 252/431 N

[56] References Cited

U.S. PATENT DOCUMENTS

| | | | |
|---|---|---|---|
| 3,450,795 | 6/1969 | Langer | 252/431 N |
| 3,451,988 | 6/1969 | Langer | 252/431 N |
| 3,474,143 | 10/1969 | Butte | 252/431 N |
| 3,541,149 | 11/1970 | Langer | 252/431 N |
| 3,890,278 | 6/1975 | Lehn et al. | 526/180 |
| 3,911,054 | 10/1975 | Roest et al. | 526/180 |
| 4,104,465 | 8/1978 | Halasa | 526/180 |

Primary Examiner—William F. Hamrock

[57] ABSTRACT

The catalyst system disclosed herein comprises a combination or a chelate of a hydrocarbyl lithium compound with a bicyclic amine compound bridged together through nitrogen in each cyclic ring by means of 1-4, preferably 2-carbon atoms and each cyclic ring having at least one nitrogen and at least one other heteroatom in its cyclic structure selected from the class consisting of NR, O, S and PR. This catalyst system is particularly useful in the polymerization of vinyl compounds such as ethylene, propylene, styrene, butadiene, etc. The process for the polymerization of conjugated dienes produces polymers of excellent properties. For example, with butadiene-1,3 and other appropriate conditions, polybutadiene with high percentages of syndiotactic crystalline structure may be produced.

15 Claims, No Drawings

PROCESS FOR POLYMERIZING CONJUGATED DIENES

This is a division of application Ser. No. 86,222 filed Oct. 18, 1979.

BACKGROUND OF THE INVENTION

1. Field of the Invention

This invention relates to a catalyst system suitable for the polymerization of vinyl compounds. More specifically, it relates to a chelate of a hydrocarbyl lithium compound and a bicyclic compound having two heterocyclic ring structures joined together through nitrogen atoms in the respective rings by means of a bridge of 1-4 carbon atoms, each heterocyclic ring having at least a second heteroatom in the ring structure thereof selected from NR, O, S and PR. Moreover, this invention relates to a process of polymerizing vinyl compounds using such a catalyst. Still more specifically this process relates to a process of polymerizing conjugated dienes to prepare highly crystalline polymers, for example, polymerizing butadiene to polymers containing a high percentage of syndiotactic polybutadiene.

2. Related Prior Art

U.S. Pat. No. 3,451,988 describes a polymerization catalyst and a process for polymerizing vinyl compounds therewith that utilizes hydrocarbyl lithium and magnesium compounds together with a bifunctional Lewis base which is described as including tertiary diamines in which the nitrogen atoms in the diamines are bridged by 1-4 carbon atoms. Although the tetramethylethylene diamine (TMEDA) appears to be the preferred diamine since it is used more often in the examples, 1,2-dipiperidino ethane, as well as others, are also indicated as suitable.

However, the highest 1,2 contents of polybutadiene reported for TMEDA are the 87.5% and 89% reported in Col. 16. The highest 1,2 content reported in the patent is the 95% reported for tetrahydrofuran (THF), also in Col. 16, but this is associated with a conversion or yield of only 33%. Moreover, with the preferred TMEDA there is subsequent methylation as described in Col. 15 of the patent.

SUMMARY OF THE INVENTION

In accordance with the present invention it has been found that a very effective catalyst system for polymerization comprises the combination of a hydrocarbyl lithium with a bicyclic amine compound, the two cyclic structures therein being through nitrogen in the respective rings by means of 1-4, preferably 2 or 4 carbon atoms, and each cyclic ring having at least one nitrogen and at least one other heteroatom in its cyclic structure selected from the class consisting of NR, O, S and PR. This catalyst combination is particularly effective in the polymerization of vinyl compounds such as ethylene, propylene, styrene, butadiene, isoprene, etc., particularly with regard to producing highly crystalline polymers from conjugated dienes by use of certain of these catalysts. When the bridging group between the connecting nitrogen atoms comprises two or four carbon atoms, the resultant chelate ring structure is capable of producing polybutadiene having a very high content of syndiotactic-1,2 crystalline structure. When this bridging group comprises 1 or 3 carbon atoms, the polymer product has a low 1,2 content but the modifier is effective in reducing the initiation induction period and the polymer solution has a viscosity more suitable for good heat transfer.

In the bicyclic amine compounds, each of the rings may contain 5-7 atoms, preferably 6 atoms including the nitrogen and the additional hetero atom or atoms. When there is only one other hetero atom in addition to the joining N atom, the structure may be represented by the following formula:

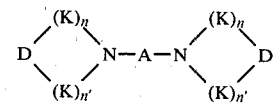

wherein D represents NR, O, S or PR; R represents a hydrocarbyl group of 1-20 carbon atoms, A represents a hydrocarbon bridging group of 1-4 carbon atoms, which may be present in an alkylidene radical, an alkenylidene radical, a cycloalkylidene radical, a cycloalkenylidene radical, an arylene radical or combinations of these; K represents a divalent hydrocarbon group of the formula —CH$_2$— or —CH=, n represents an integer having a value of 1-5 and n' represents an integer having a value of 0-4, with the sum of n and n' totaling 3-5. When there are more than two hetero atoms in the cyclic structure, the additional hetero atoms replace one or more of the carbons in the (C) group. It is preferred that there should be no more than three hetero atoms per ring structure. In fact sufficient improvement is obtained with only two hetero atoms per ring so that it is not particularly advantageous to go to more than two hetero atoms per ring. Moreover, while the formula shows single bonds in the cyclic structure, pairs of atoms in the ring may also be joined by double bonds as shown below.

Typical ring structures represented by the formula

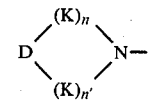

are illustrated but not restricted to the following:

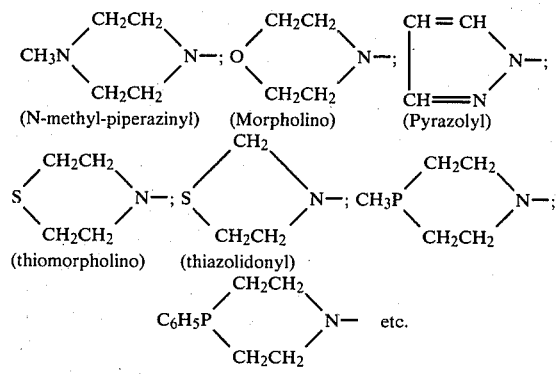

Typical A groups in the above formula are illustrated by, but not restricted to, the following: —CH$_2$—, —CH$_2$CH$_2$—, —CH(CH$_3$)CH$_2$—, —CH=CH—, —C(CH$_3$)=CH$_2$—, —CH$_2$CH$_2$CH$_2$—, —CH$_2$CH$_2$CH$_2$CH$_2$—, —CH(CH$_3$)CH$_2$CH$_2$—, —CH(CH$_3$)CH$_2$CH$_2$CH$_2$—, —CH(C$_6$H$_5$)CH$_2$—, —CH(C$_6$H$_{11}$)CH$_2$, —C$_6$H$_{10}$—, —C$_6$H$_4$—, —C$_6$H$_9$(CH$_3$), —C$_6$H$_3$(C$_2$H$_5$)—, —C$_6$H$_3$(CH$_3$)—, —CH$_2$(C$_4$H$_9$)CH$_2$—, —C(C$_6$H$_5$)=CH—, etc.

Typical diamine compounds suitable for the practice of this invention include 1,2-di(morpholino-N-)ethane, 1,2-di(N-methylpiperazinyl-N-)ethane, 1,2-di(pyrazolyl-N-)ethane, 1,2-di(pyrazolinyl-N-)ethane, 1,2-di(thiazolyl-N-)ethane, 1,2-di(triazolyl-N-)ethane, 1,2-di(indolyl-N-)ethane, 1,2-di(morpholino-N-)propane, 1,2-di(N-ethylpiperazinyl-N-)butane, 2,3-di(pyrazolyl-N-)pentane, 1,3-di(pyrazolinyl-N-)butane, 1,4-di(thiazolyl-N-)pentane, 1,2-di(morpholino-N-) cyclohexane, 1,2-di(morpholino-N-)benzene, 1-phenyl-1,2-di(morpholino-N-)ethane, 1-phenyl-2,3-di(N-methylpiperazinyl-N-)propane, etc.

The hydrocarbyl lithium compounds may be represented by the formula RLi wherein R is a hydrocarbyl radical of 1-20 carbon atoms, advantageously an aliphatic radical of 1-20, preferably 3-6 carbon atoms, but may also be cycloaliphatic or aromatic of 6-20, preferably 6-12 carbon atoms. Preferred RLi compounds are n-butyl and sec-butyl lithium. Other suitable RLi compounds include but are not restricted to those in which the R groups are ethyl, n-propyl, isopropyl, n-amyl, sec-amyl, sec-hexyl, n-hexyl, octyl, nonyl, decyl, dodecyl, octadecyl, phenyl, tolyl, dimethylphenyl, ethylphenyl, naphthyl, cyclohexyl, methylcyclohexyl, ethylcyclohexyl, cycloheptyl, allyl, 2-butenyl, 2-methyl butenyl, cyclopentylmethyl, methylcyclopentylethyl, phenylethyl, cyclopentadieneyl, naphthyl, phenylcyclohexyl, etc.

The catalyst components may be premixed or may be added to the solvent in which the polymerization is to be effected or may be added to the solution containing the monomer. Generally the molar ratio of diamine to RLi is 0.25-10 moles, preferably, 0.5-2 moles per mole of RLi. Advantageously the catalyst is used in a proportion of 0.15-20 millimoles of the RLi per 100 grams of monomer.

The polymerization is advantageously conducted in a solvent. Hexane is preferred as well as other alkanes, advantageously of 3-20 carbon atoms, preferably 5-10 carbon atoms, such as butane, pentane, heptane, octane, decane, etc. However, other nonaromatic hydrocarbon solvents such as cycloalkanes, e.g., cyclohexane, methylcyclohexane, cycloheptane, etc. may also be preferred. These cycloalkanes advantageously have 6-20, preferably 6-10 carbon atoms. Toluene and other aromatics may act as telomerizing agents and thereby reduce the average molecular weight of the product. However where this is not critical, aromatic solvens may be used. Advantageously a butadiene concentration of 15-50 percent is desirable, preferably about 20-35 percent.

In the catalyst system and polymerization process of this invention it is necessary to take the standard precautions against contamination of an organometallic system with impurities such as water, air, etc. which will deactivate or reduce the efficiency of the system. Consequently, the solvent, reagents, reactor and atmosphere in the reactor area are treated accordingly to avoid such contaminants. Advantageously there is less than 25 ppm, preferably less than 5 ppm of water present.

The polymerizations are conducted in autoclaves, pressurized reactors or bottles capable of withstanding the pressures generated at the temperature used.

While a substantial amount of polymerization is effected within one hour, a more substantial amount of polymerization is effected within three hours. However generally six hours or more are desired for greater yields and while polymerization is generally substantially completed within sixteen hours, depending on the temperature, there is no harm or adverse result in allowing polymerization to continue 70 hours or more.

When polymerization is completed, the catalyst is deactivated by the addition of a small amount of alcohol or acid, calculated on the amount of catalyst present. Then the polymer product is recovered by dumping the reaction mass in a large volume of methanol or isopropanol or other low molecular weight alcohol, preferably one containing a small amount, such as 1 percent, of an antioxidant, such as di-t-butyl cresol. The precipitated polymer is recovered and dried before processing, preferably by drum drying at an appropriate temperature for evaporation of any remaining solvent.

These catalyst systems are particularly effective in the polymerization of conjugated dienes to high molecular weight polymers of excellent properties. For example, butadiene may be polymerized by these catalysts to excellent yields as high as 100% and with as high as 100% 1,2 configuration and in most cases, predominantly of syndiotactic crystalline structure. Other conjugated dienes that may be effectively polymerized by such systems include isoprene, 2,3-dimethyl-butadiene, pentadiene-1,3, 2-phenyl-1,3-butadiene and other conjugated dienes having up to 10 or more carbon atoms. Copolymers may be prepared using two or more of these dienes or a diene with other vinyl compounds such as listed below.

In addition to these dienes, other vinyl monomers may be polymerized by these catalyst systems to high molecular weight polymers. Such other vinyl compounds include ethylene, propylene, butene-1, isobutylene, styrene, vinyl toluene, vinyl naphthalene, etc.

Although butadiene homopolymers are preferred products in the practice of this invention, butadiene copolymers may also be highly desirable where the comonomers impart desirable properties and do not detract from the polymer properties. The comonomers may be olefins, such as butene-1, n-butene-2, isobutylene, n-penten-1, n-pentene-2 and the like, and preferably vinyl arenes, including vinyl arene or isopropenyl arene derivatives having alkyl, aralkyl, cycloalkyl or chlorine attached to the aromatic nucleus and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl-styrene, vinyl napthalene, vinyl ethyl naphthalene, vinyl methyl naphthalene, vinyl butyl naphthalene, isopropenyl naphthalene, isopropenyl methyl naphthalene, 1-vinyl-4-chloronaphthalene, 1-isopropenyl-b-5-chloronaphthalene, vinyl diphenyl, vinyl diphenylethane, 4-vinyl-4'-methyldiphenyl, 4-vinyl-4'-chlorodiphenyl, and the like. Preferably such comonomers have no more than 12 carbon atoms. Where such comonomers are to be used, generally at least 1 percent, preferably at least 5 percent by weight should be used and as much as 60 percent, preferably no more than 30 percent may be used.

In referring above to millimoles of catalyst this corresponds to the millimoles of lithium components since the catalyst is regarded or at least calculated as a chelate or complex of the Li compound. The anionic polymerization system of this invention permits close control of the molecular weight of the high vinyl polybutadiene. The molecular weight ($M_n$) of the hydrogenated product is advantageously in the range of 50,000–1,000,000, preferably 100,000–1,000,000. Furthermore, narrow molecular weight ranges may be desired for specific properties.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

Procedure for Preparation of High Vinyl Polybutadiene of Controlled Molecular Weight The following typical procedure is used to prepare the high vinyl polybutadiene: A cleaned 2-gallon stainless steel reactor equipped with stirrer, appropriate heating and cooling means and appropriate inlets and outlets is prepared for reaction by filling it under a nitrogen atmosphere with hexane and adding n-butyl lithium in an amount sufficient to reat with impurities in the hexane and on the surface of the reactor. The mixture is stirred and heated to 150° F. (65° C.) for about an hour. Then this mixture is drained under a nitrogen atmosphere and the material discarded. Next 7.5 lbs. of a blend containing 24 percent 1,3-butadiene (817 gms. butadiene) and 76 percent of hexane is charged to the reactor under nitrogen and cooled to 41° F. (5° C.) before adding 16.5 millimoles of n-butyl lithium and 33 millimoles of 1,3-di-(N-methyl-piperazinyl-N')-ethane (DMPE). The temperature is maintained at 41° F. (5° C.) and efficient stirring effected. After about 8 hours of reaction the product is dropped into a large volume of isopropanol containing an antioxidant. The precipitated product is recovered and drum-dried to give substantially 100% yield of a polymer having a molecular weight of about 50,000 $M_n$ and a 1,2 content of substantially 100%.

The molecular weight may be increased by decreasing the amount of n-butyl lithium and decreased by increasing the amount of n-butyl lithium, advantageously with appropriate changes in the amount of DMPE to give a DMPE/Li ratio of approximately 2. This method of varying or controlling the molecular weight by varying the amount of catalyst used per mole of monomer is well known in the anionic polymerization art.

The polymerization temperature has an effect on the 1,2 content of the product with increase in temperature within limits decreasing the 1,2 content, and vice versa, within limits. It is generally desirable to maintain a temperature no higher than 41° F. (5° C.) to obtain maximum 1,2 content as shown by the following table:

| Temperature | Approximate 1,2 Content |
| --- | --- |
| Below 41° F. (5° C.) | 100% |
| 41° F. (5° C.) | 99.8% |
| 48° F. (9° C.) | 98% |
| 75° F. (24° C.) | 97% |
| 85° F. (29° C.) | 95% |
| 90° F. (32° C.) | 90% |

| Temperature | Approximate 1,2 Content |
| --- | --- |
| Above 90° F. (32° C.) | Less than 90% |

In Example II described below the experiments are performed in 28 ounce bottles capped with a rubber septum through which various additions can be made by hypodermic needle. The bottles are cleaned and dried before use and swept out with nitrogen prior to addition of reagents and a nitrogen atmosphere maintained during polymerization. The product is reduced by dumping into methanol containing 1 percent antioxidant and is drum-dried.

EXAMPLE II

In a series of four experiments a blend of 24 percent 1,3-butadiene (50 gms.) in hexane is charged to each of four 28 ounce bottles and then there is added to each bottle 1,2-dimorpholinoethane (DME), followed by n-butyl lithium in a molar ratio of 1 mole of DME per mole of nBuLi. The proportion of nBuLi is 2 millimoles per 100 gms. of butadiene. The bottles are agitated and heated at different temperatures with the reaction time extended for lower temperatures to compensate for slower reaction rate. The conditions and results are as reported in the Table below:

TABLE II

| Run No. | 1 | 2 | 3 | 4 |
| --- | --- | --- | --- | --- |
| Molar ratio (Diamine/RLi) | 1/1 | 1/1 | 1/1 | 1/1 |
| Temp. (°C.) | 5 | 30 | 50 | 70 |
| Polym. Time (hours) | 43 | 22 | 18 | 18 |
| Conversion (%) | 75 | 89 | 86 | 85 |
| % 1,2 | 88.3 | 61.5 | 34.1 | 16.7 |

EXAMPLE III

The procedure of Example II is repeated using a molar ratio of 4/1 instead of 1/1. The results are reported below in Table III:

TABLE III

| Run No. | 5 | 6 | 7 | 8 |
| --- | --- | --- | --- | --- |
| Molar Ratio | 4/1 | 4/1 | 4/1 | 4/1 |
| Temp. (°C.) | 5 | 30 | 50 | 70 |
| Polym. Time (hours) | 43 | 22 | 18 | 18 |
| Conversion (%) | 87 | 86 | 88 | 87 |
| % 1,2 | 98.1 | 85.9 | 63.1 | 28.5 |

EXAMPLE IV

The procedure of Example II and III are repeated with similar results using equivalent amounts, respectively of:

(a) 1,2-di-N-methyl-piperazinyl-N'-ethane:

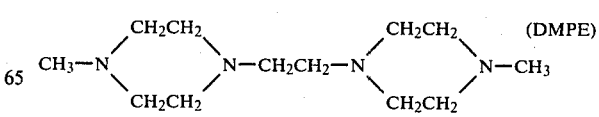

(b) 1,2-dipyrazolyl-N-ethane:

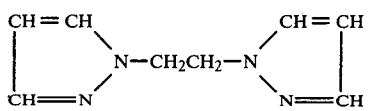

(c) 1,2-di(thiomorpholino-N-)ethane

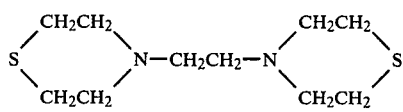

(d) 1,2-di(thiazolidinyl-N-)ethane:

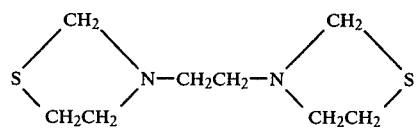

(e)

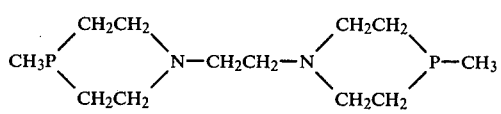

EXAMPLE V

The procedure of Example II is repeated a number of times using a blend of 19.6 percent butadiene in cyclohexane. In one run no modifier is used, in two runs 1,2-(dimorpholino-N-)ethane is used (at 30° C. and 5° C., respectively) and in two other runs 1,3-(dimorpholino-N-)propane is used (at 30° C. and 5° C., respectively). The run with no modifier has a much longer induction period and the runs with modifier have a reduced viscosity under high conversions and thereby improved heat transfer. The products from the runs using the propane bridging group have a much lower 1,2 content than the runs using the modifiers with ethane bridging groups in accordance with the discussion above. The results are given below in Table V.

TABLE V

| Run No. | 9 | 10 | 11 | 12 | 13 |
|---|---|---|---|---|---|
| Butadiene (gms) | 49 | 54.1 | 51.4 | 53.3 | 47.6 |
| BuLi (mM) | 0.47 | 0.47 | 0.47 | 0.47 | 0.47 |
| Modifier: | | | | | |
| DME(mM) | — | 0.918 | — | 0.918 | — |
| DMP (mM) | — | — | 0.970 | — | 0.970 |
| Polym. Temp (°C.) | 30 | 30 | 30 | 5 | 5 |
| Polym. Time (Hrs.) | 16 | 16 | 16 | 64 | 64 |
| Yield: | | | | | |
| Gms. | 47 | 54 | 50 | 52.5 | 25 |
| % | 96 | 100 | 97 | 98 | 53 |
| % 1,2 | 11.1 | 63.9 | 12.8 | 87.8 | 19.4 |

Although as pointed out above, the temperature is advantageously kept low to produce approximately 100 percent 1,2 microstructure, it is permissible to use the catalyst systems and process of this invention at higher temperatures in accordance with the amount of 1,2 structure to be in the polymer product. Accordingly the temperature is advantageously in the range of −20° C. to 150° C., preferably −10° C. to 100° C. However where high 1,2 contents are desired in the polymer, the temperature is advantageously below 35° C., preferably no higher than 5–10° C.

While it is not intended that the invention is to be construed or interpreted on the basis of the exact structure of the combination of the dicyclic diamine modifier with the RLi initiator, it is believed that the modifier initiator is present in the system as a chelate of the following structure:

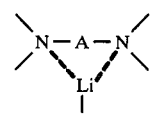

Where A represents dimethylene or ethylene the chelate would have the preferred structure:

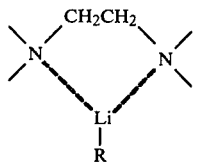

This preferred structure has a 5-membered chelate ring which is favorable to the formation of high 1,2-content in the resultant polymers. When the ethylene group has one or more of the hydrogen atoms replaced by hydrocarbyl groups, the chelate ring is still 5-membered and is still favorable to high 1,2-content.

Where A represents methylene or trimethylene the resultant chelate ring is 4-membered or 6-membered respectively. on either case this modification does not favor high 1,2 formation in the polymer. However, 7-membered chelate rings, as formed with tetramethylene groups, form 1-2 formation similar to those produced by the 5-membered chelate rings.

An important advantage of using the catalyst system of this invention is the fact that lower viscosities are produced in the polymerization system. By virtue of these lower viscosities heat transfer to and from the reaction mass is more efficient. With modifiers such as tetrahydrofuran (THF) and tetramethylethylenediamine (TMEDA) the resultant high viscosity results in poor heat transfer and therefore concentrations of no more than about 24 percent are allowable. However with the lower viscosities resulting from the use of the bicyclic amine modifiers of this invention it is possible to polymerize to concentrations as high as 40 percent allowing for higher concentrations of monomer. This means more economical use of equipment, materials and energy. Moreover the lower viscosities permit more efficient heat transfer and therefore improved use of energy. Generally it is not necessary to add additional heat to maintain polymerization.

The improved viscosity allows satisfactory agitation to be effected with a minimum amount of torque in the agitating equipment thereby also reducing the amount of energy required. The resultant more uniform distribution allows concentrations of monomer in hexane as high as 40 percent to produce polymers of 200,000–400,000 and even higher with gelation. Therefore the economics of this type of polymerization are very favorably affected by the catalyst systems of this invention.

The dicyclic amines used in the practice of this invention are easily prepared by the reaction of two moles of an appropriate heterocyclic amine, having a replaceable hydrogen on the nitrogen atom to be bridged with one mole of a dihalo alkane selected to give the desired bridging group. This reaction is preferably carried out in the presence of a tertiary amine which will form a salt with the byproduct hydrogen halide. For example, two moles of N-methyl-piperazine may be reacted with one mole of ethlyene dichloride in the presence of a slight excess of triethylamine to give 1,2-di (N-methyl-piperazinyl-N'-) ethane.

While certain features of this invention have been described in detail with respect to various embodiments thereof, it will of course be apparent that other modifications can be made within the spirit and scope of this invention and it is not intended to limit the invention to the exact details shown except insofar as they are defined in the following claims.

The invention claimed is:

1. A process for the liquid phase polymerization of a conjugated diene having 4–10 carbon atoms at a temperature of $-20°$ to $150°$ C. while in intimate contact with a polymerization catalyst, the proportion of said catalyst being in the range of 0.15–20 millimoles of the organometal component for 100 grams of conjugated diene, said polymerization catalyst comprising: (a) an RLi organo-metal compound in which R is a monovalent hydrocarbyl radical of 1 to 20 carbon atoms, and (b) a bicyclic amine of the formula:

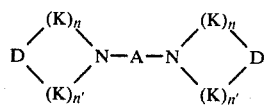

wherein D represents RN, O, S or PR; R represents a hydrocarbyl group of 1–20 carbon atoms; A represents a divalent hydrocarbon group having 1–4 carbon atoms between said two valencies; K represents a hydrocarbon group of the formula $-CH_2$ or $-CH=$; n represents an integer having a value of 1 to 5; and n' represents an integer having a value of 0 to 4 with the sum of n and n' totaling 3–5; the proportion of said bicyclic amine being 0.25 to 10 moles per mole of said organometal compound.

2. The process of claim 1 in which said diene is isoprene.

3. The process of claim 1 in which said diene is butadiene-1,3.

4. The process of claim 3 in which said A group represents $-CH_2CH_2-$.

5. The process of claim 4 in which said temperature is no higher than $35°$ C.

6. The process of claim 5 in which said temperature is in the range of $-20°$ C. to $10°$ C.

7. The process of claim 6 in which said butadiene is in hexane solution at a concentration of 15–40 percent by weight.

8. The process of claim 7 in which 0.5–2 moles of organometal compound is used per 100 grams of butadiene.

9. The process of claim 8 in which said bicyclic amine is 1,2-di(N-methyl-piperazinyl-N'-)ethane.

10. The process of claim 8 in which said bicyclic amine is 1,2-di(pyrazolyl-N-)ethane.

11. The process of claim 8 in which said amine is 1,2-di(morpholino-N-)ethane.

12. The process of claim 8 in which said bicyclic amine is 1,2-di(thiomorpholine-N-)ethane.

13. The process of claim 23 in which said bicyclic amine is 1,2-di(thiazolidinyl-N-)ethane.

14. The process of claim 23 in which said bicyclic amine is 1,2-di(N-methyl-piperazinyl-N'-)ethane.

15. The process of claim 23 in which said bicyclic amine is 1,2-di(pyrazolyl-N-)ethane.

* * * * *

UNITED STATES PATENT AND TRADEMARK OFFICE
CERTIFICATE OF CORRECTION

PATENT NO. : 4,264,753
DATED : April 28, 1981
INVENTOR(S) : Adel F. Halasa and James E. Hall It is certified that error appears in the above-identified patent and that said Letters Patent are hereby corrected as shown below:

In the Abstract, line 5

"2-carbon" should read -- 2-4 carbon --

Col. 3, line 50

"solvens" should read -- solvents --

Col. 5, line 25

"reat" should read -- react --

Col. 8, line 36

"on either" should read -- In either --

Signed and Sealed this

Fourteenth Day of July 1981

[SEAL]

Attest:

Attesting Officer

GERALD J. MOSSINGHOFF

Commissioner of Patents and Trademarks